US010315285B2

(12) United States Patent
Li et al.

(10) Patent No.: US 10,315,285 B2
(45) Date of Patent: Jun. 11, 2019

(54) CMP COMPOSITION AND METHOD FOR POLISHING RIGID DISKS

(71) Applicant: Cabot Microelectronics Corporation, Aurora, IL (US)

(72) Inventors: Tong Li, Singapore (SG); Michael White, Ridgefield, CT (US); Selvaraj Palanisamy Chinnathambi, Singapore (SG); Ke Zhang, Singapore (SG)

(73) Assignee: Cabot Microelectronics Corporation, Aurora, IL (US)

( * ) Notice: Subject to any disclaimer, the term of this patent is extended or adjusted under 35 U.S.C. 154(b) by 307 days.

(21) Appl. No.: 15/091,275

(22) Filed: Apr. 5, 2016

(65) Prior Publication Data
US 2016/0288290 A1  Oct. 6, 2016

Related U.S. Application Data

(60) Provisional application No. 62/143,372, filed on Apr. 6, 2015.

(51) Int. Cl.
*B24B 37/24* (2012.01)
*C09G 1/04* (2006.01)

(52) U.S. Cl.
CPC .............. *B24B 37/24* (2013.01); *C09G 1/04* (2013.01)

(58) Field of Classification Search
None
See application file for complete search history.

(56) References Cited

U.S. PATENT DOCUMENTS

| 6,242,351 | B1 * | 6/2001 | Li .......................... C09G 1/02 216/89 |
| 6,258,140 | B1 | 7/2001 | Shemo et al. |
| 6,332,831 | B1 | 12/2001 | Shemo et al. |
| 9,039,914 | B2 | 5/2015 | Palanisamy Chinnathambi et al. |
| 2003/0171072 | A1 | 9/2003 | Ward et al. |
| 2006/0096496 | A1 | 5/2006 | Sun et al. |
| 2008/0210665 | A1 | 9/2008 | Tamai et al. |

(Continued)

FOREIGN PATENT DOCUMENTS

TW  200845177 A  11/2008

OTHER PUBLICATIONS

Taiwan Intellectual Property Office, Search Report issued in connection with Taiwan Patent Application No. 105110788 dated May 16, 2017.

*Primary Examiner* — Duy Vu N Deo
(74) *Attorney, Agent, or Firm* — Thomas Omholt; Erika S. Wilson; Salim A. Hasan

(57) ABSTRACT

The invention provides a chemical-mechanical polishing composition and a method of chemically-mechanically polishing a substrate, such as a nickel-phosphorous substrate. The composition contains water, silica particles, a first alcohol comprising one or more of monohydric alcohol, polyhydric alcohol, and diglycol, a second alcohol in the form of polyvinyl alcohol, a nickel complexing agent, and optionally hydrogen peroxide, pH adjuster, and/or biocide. The method involves contacting the substrate with a polishing pad and the chemical-mechanical polishing composition, moving the polishing pad and the polishing composition relative to the substrate, and abrading at least a portion of the substrate to polish the substrate.

18 Claims, 1 Drawing Sheet

(56) References Cited

U.S. PATENT DOCUMENTS

2010/0035433 A1* 2/2010 Takemiya .............. C09G 1/02
438/693
2013/0313226 A1* 11/2013 Palanisamy Chinnathambi ..........
C09K 3/1463
216/53

* cited by examiner

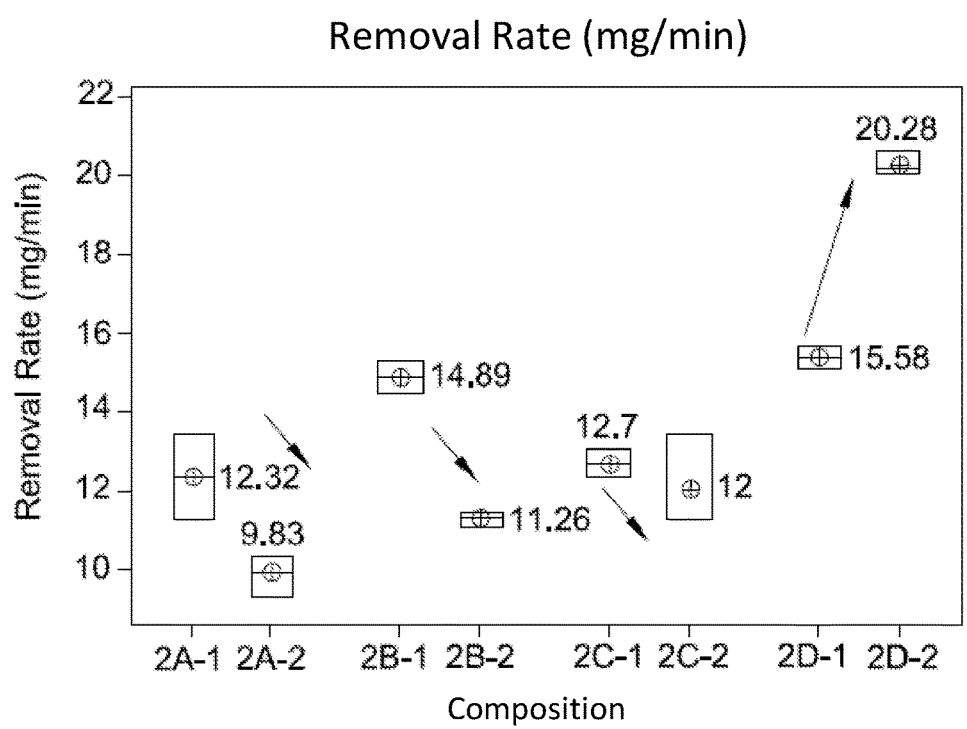

CMP COMPOSITION AND METHOD FOR POLISHING RIGID DISKS

BACKGROUND OF THE INVENTION

The demand for increased storage capacity in memory or rigid disks and the trend towards miniaturization of memory or rigid disks (e.g., due to the requirement for smaller hard drives in computer equipment) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

As the demand for increased storage capacity has increased, so has the need for improved processes for the polishing of such memory or rigid disks. The term "memory or rigid disk" refers to any magnetic disk, hard disk, rigid disk, or memory disk for retaining information in electromagnetic form. The memory or rigid disk typically has a surface that comprises nickel-phosphorous (NiP), but the memory or rigid disk surface can comprise any other suitable material. The planarity of the memory or rigid disks must be improved, as the distance between the recording head of a disk drive and the surface of the memory or rigid disk has decreased with improvements in recording density that demand a lower flying height of the magnetic head with respect to the memory or rigid disk. In order to permit a lower flying height of the magnetic head, improvements to the surface finish of the memory or rigid disk are required.

Conventional CMP compositions and methods for NiP hard disks and other substrates could be improved because, as removal rate is increased, there is often a concomitant deterioration of other polishing performance, e.g., surface roughness, defectivity, and the like. Furthermore, conventional CMP compositions and methods can be inefficient and require significant cycle time and labor intensity. There is a need for a polishing composition and method that addresses these concerns.

BRIEF SUMMARY OF THE INVENTION

In one aspect, the invention provides a polishing composition comprising, consisting of, or consisting essentially of silica; a first alcohol having a flash point of at least about 10° C. (50° F.); a second alcohol consisting of polyvinyl alcohol; one or more of a nickel complexing agents; and water. Optionally, hydrogen peroxide, pH adjuster, and biocide can be included in the polishing composition.

In another aspect, the invention provides a polishing composition comprising, consisting of, or consisting essentially of silica; a first alcohol comprising one or more of monohydric alcohol, polyhydric alcohol, and diglycol; a nickel complexing agent; a second alcohol consisting of polyvinyl alcohol; and water. Optionally, one or more of hydrogen peroxide, pH adjuster, and biocide can be included in the polishing composition.

In another aspect, the invention provides a method of polishing a substrate. The method comprises, consists of, or consists essentially of providing a substrate and providing a polishing pad. The method also provides a polishing composition. The polishing composition comprises, consists of, or consists essentially of (a) silica; (b) a first alcohol having a flash point of at least about 10° C. (50° F.); (c) a nickel complexing agent; (d) a second alcohol consisting of polyvinyl alcohol; and (e) water. Optionally, one or more of hydrogen peroxide, pH adjuster, and biocide can be included in the polishing composition. The polishing composition is dispensed to a surface of the substrate, and the polishing pad contacts the surface of the substrate. The surface of the substrate is abraded to remove at least some portion of the substrate, and to polish the surface of the substrate.

In another aspect, the invention provides a method of polishing a substrate. The method comprises, consists of, or consists essentially of providing a substrate and providing a polishing pad. The method also provides a polishing composition. The polishing composition comprises, consists of, or consists essentially of (a) silica; (b) a first alcohol comprising one or more of monohydric alcohol, polyhydric alcohol, and diglycol; (c) a second alcohol consisting of polyvinyl alcohol; (d) a nickel complexing agent; and (e) water. Optionally, one or more of hydrogen peroxide, pH adjuster, and biocide can be included in the polishing composition. The polishing composition is dispensed to a surface of the substrate, and the polishing pad contacts the surface of the substrate. At least a portion of the surface of the substrate is abraded to remove at least some portion of the substrate and to polish the surface of the substrate.

BRIEF DESCRIPTION OF THE SEVERAL VIEWS OF THE DRAWING

FIG. 1 is a boxplot comparing the polishing performance in terms of removal rate ("RR") (mg/min) of eight polishing compositions as described in Example 2.

DETAILED DESCRIPTION OF THE INVENTION

The invention provides a polishing composition and a method of polishing a substrate. The polishing composition provides silica abrasive particles, preferably in the form of colloidal silica. The composition also comprises a first alcohol, a second alcohol in the form of polyvinyl alcohol, a nickel complexing agent and water. For example, in various embodiments, a first alcohol comprises one or more of monohydric alcohol, polyhydric alcohol, and diglycol and/or the alcohol is exhibited by a flash point of at least about 10° C. (50° F.). In various embodiments, additional components can be included in the polishing composition, including, one or more of, hydrogen peroxide, pH adjuster, and/or biocide.

Embodiments of the invention provide a chemical-mechanical polishing (CMP) composition and method that produce enhanced removal of at least some portion of a substrate being polished. The polishing composition and method in accordance with embodiments of the invention allow for higher throughput (e.g., higher or faster removal rate) while reducing negative effects on polishing performance (e.g., with respect to surface roughness or defectivity). As utilized herein, the term "defectivity" refers to counting defects (e.g., scratches), present on a substrate after polishing a substrate with a polishing composition. Defectivity can be measured by scanning electron microscopy known to those skilled in the art. The first alcohol and other components as desired of the polishing composition surprisingly and unexpectedly are stable and work together synergistically to achieve higher throughput of the desired removal without compromising polishing performance.

In accordance with some embodiments, the polishing can be conducted in a one-step process. While conventional polishing processes for some substrates (e.g., nickel-phosphorus hard disks) can require two steps (typically a bulk polishing step and a fine polishing step), embodiments of the invention surprisingly and unexpectedly can be used in a one-step process for hard disks and other substrates without the need for separate bulk and fine polishing steps. Advantageously, such a one-step process is more efficient and cost-effective by, for example, reducing cycle time and labor intensity. Embodiments of the invention can realize high removal rates without compromising polishing performance, all in a single-step polishing process (i.e., that does not require separate steps for bulk polishing and fine polishing).

The substrate to be polished using the polishing composition and method of the invention can be any suitable substrate, such as a substrate that contains nickel-phosphorous. In some embodiments, the substrate comprises at least one layer, especially an exposed layer for polishing, comprising, consisting essentially of, or consisting of nickel-phosphorous. Particularly suitable substrates include, but are not limited to, memory or rigid disks, such as aluminum disks coated with nickel-phosphorous. However, it will be understood that the inventive polishing composition and method can be used with other substrates, including for metal polishing with respect to semiconductor wafers used in fabrication of integrated circuits and other microdevices.

The polishing composition includes abrasive particles. Silicon dioxide-based abrasive particles (also referred to herein as "silica") are particularly suited to be used in accordance with embodiments of the invention. In this regard, silica has been found to be favorable with regard to polishing magnetic substrates (e.g., NiP) in the inventive composition because it produces low defectivity such as low scratch counts and no embedded hard particles, such as is seen with alumina abrasives. The silica can be any suitable form of silica such as wet-process type silica, fumed silica, or combinations thereof. For example, the silica can comprise wet-process type silica particles (e.g., condensation-polymerized or precipitated silica particles, also known as colloidal silica). For example, the silica can be in the form of colloidal silica or fumed silica, with colloidal silica being the preferred abrasive particle.

The silica particles can have any suitable average particle size (i.e., average particle diameter). For clarity, it will be understood that, for non-spherical particles, the size of the particle is the diameter of the smallest sphere that encompasses the particle. For example, in some embodiments, the silica has an average particle size of from about 5 nm to about 80 nm. In some embodiments, the silica has an average particle size of, e.g., from about 5 nm to about 60 nm, from about 10 nm to about 40 nm, or from about 12 nm to about 35 nm. Preferably, the silica can have an average particle size of about 40 nm or less.

The unmodified phrase "particle size", as utilized herein, refers to individual silica particles dispersed in an aqueous carrier (e.g., water), which particles may be primary or secondary particles depending on the nature of the particles. The particle size can be measured using any suitable technique, for example, using laser diffraction techniques known to those skilled in the art.

The silica particles can be present in any suitable amount. For example, the silica particles can be present in an amount of from about 0.01 wt. % to about 10 wt. %. In some embodiments, the silica is present, e.g., in an amount from about 0.01 wt. % to about 5 wt. %, such as from about 0.01 wt. % to about 10 wt. %, such as from about 0.1 wt. % to about 10 wt. %, or from about 0.1 wt. % to about 5 wt. %.

The polishing composition comprises a first alcohol. The alcohol can exhibit a flash point of at least about 10° C. (50° F.) and/or be in the form of one or more of monohydric alcohol, polyhydric alcohol, and diglycol. In accordance with some embodiments, the first alcohol is selected from monohydric alcohols according to the formula $C_nH_{2n+1}(OH)$; polyhydric alcohols according to the formula $C_mH_{2m+2-n}(OH)_n$ (m=n); and/or diglycols according to the formula $HOCH_2CH_2(OCH_2CH_2)_xOH$; where m is from about 1 to about 12, n is from about 1 to about 11, and x is from 0 to about 12. Examples of suitable monohydric alcohols include, but are not limited to, isopropanol ("IPA"), butyl alcohol (e.g., normal, i.e., n-butyl, secondary, i.e., sec-butyl, etc.) ("BA"), or the like. Examples of suitable polyhydric alcohols include, but are not limited to, ethylene glycol ("EG"), propylene glycol, or the like. Examples of suitable diglycols include, but are not limited to, diethylene glycol, dipropylene glycol ("DPG"), or the like.

Odorless alcohols that exhibit higher flash points are preferred. As used herein, "flash point" refers to the minimum temperature of a liquid at which sufficient vapor is given off to form an ignitable mixture with air and, when ignited, will produce a flash fire, and not continuous flaming combustion, over the surface of the fuel. Alcohols with higher flash points (at least about 10° C. (50° F.)) are preferred because they do not present a fire hazard during polish.

In some embodiments, the alcohol has a flash point of, for example, from about 10° C. (50° F.) to about 200° C. (390° F.), from about 10° C. to about 150° C. (300° F.), from about 10° C. to about 100° C. (212° F.), from about 10° C. to about 70° C. (160° F.), from about 10° C. to about 50° C. (120° F.), from about 10° C. to about 25° C. (77° F.), from about 25° C. to about 200° C., from about 25° C. to about 150° C., from about 25° C. to about 100° C., from about 25° C. to about 70° C., from about 25° C. to about 50° C., from about 40° C. (100° F.) to about 200° C., from about 40° C. to about 150° C., from about 40° C. to about 100° C., from about 40° C. to about 70° C., or from about 40° C. to about 50° C.

In some embodiments, the first alcohol is one or more of isopropanol (IPA), butyl alcohol, ethylene glycol, propylene glycol, diethylene glycol, pentaerythritol, dipentaerytritol, trimethyolpropane, and dipropylene glycol. Preferably, the first alcohol can have a molecular weight of about 32 to about 500, e.g., from about 50 to about 250, or from about 60 to about 200.

The first alcohol can be present in any suitable amount. In some embodiments, the first alcohol is present in an amount of from about 0.05 wt. % to about 20 wt. %. For example, in some embodiments, the first alcohol is present in an amount of from about 0.05 wt. % to about 15 wt. %, from about 0.05 wt. % to about 10 wt. %, from about 0.05 wt. % to about 5 wt. %, from about 0.05 wt. % to about 1 wt. %, from about 0.1 wt. % to about 20 wt. %, from about 0.1 wt. % to about 15 wt. %, from about 0.1 wt. % to about 10 wt. %, from about 0.1 wt. % to about 5 wt. %, from about 0.1 wt. % to about 1 wt. %, from about 1 wt. % to about 20 wt. %, from about 1 wt. % to about 15 wt. %, from about 1 wt. % to about 10 wt. %, from about 1 wt. % to about 8 wt. % from about 1 wt. % to about 5 wt. %, or from about 1 wt. % to about 3 wt. %.

The polishing composition includes a nickel complexing agent. For example, the nickel complexing agent can comprise one or more of an organic monocarboxylic acid, an organic bicarboxylic acid, an amino carboxylic acid, and any salt thereof. In some embodiments, the nickel complexing agent comprises one or more of a hydroxy multicarboxylic acid such as hydroxyethyl ethylenediamine triacetic acid (HEDTA or HEDTA-H3), glycine, oxime- and/or dioxime-Ni complexer, such as dimethylglyoxime, or any salt thereof. In some embodiments, the nickel complexing agent consists of HEDTA alone or in combination with glycine. In other embodiments, the nickel complexing agent is a compound having at least one hydroxyl functional group and at least two carboxyl or phosphonic acid functional groups.

The nickel complexing agent is present in any suitable amount. In some embodiments, the nickel complexing agent can be present in an amount of from about 0.01 wt. % to about 10 wt. %. For example, in some embodiments, the nickel complexing agent is present in an amount of from about 0.01 wt. % to about 7 wt. %, from about 0.01 wt. % to about 5 wt. %, from about 0.01 wt. % to about 3 wt. %, from about 0.01 wt. % to about 1 wt. %, from about 0.01 wt. % to about 0.5 wt. %, from about 0.1 wt. % to about 10 wt. %, from about 0.1 wt. % to about 7 wt. %, from about 0.1 wt. % to about 5 wt. %, from about 0.1 wt. % to about 3 wt. %, from about 0.1 wt. % to about 1 wt. %, from about 0.1 wt. % to about 0.5 wt. %, from about 1 wt. % to about 10 wt. %, from about 1 wt. % to about 7 wt. % from about 1 wt. % to about 5 wt. %, or from about 1 wt. % to about 3 wt. %.

The polishing composition further comprises a second alcohol, particularly in the form of polyvinyl alcohol. While not wishing to be bound by any particular theory, a benefit of introducing polyvinyl alcohol into the polishing composition is for lowering defectivity upon polishing. In addition to lowering defect counts, the polyvinyl alcohol can contribute to increasing removal rate performance of the polishing composition, in accordance with embodiments of the invention.

The polyvinyl alcohol can have any suitable molecular weight. For example, in some embodiments, the polyvinyl alcohol has a molecular weight of from about 2,000 g/mol to about 50,000 g/mol. For example, the polyvinyl alcohol molecular weight can be from about 2,000 g/mol to about 40,000 g/mol, from about 2,000 g/mol to about 30,000 g/mol, from about 2,000 g/mol to about 20,000 g/mol, from about 2,000 g/mol to about 10,000 g/mol, from about 2,000 g/mol to about 8,000 g/mol, from about 2,000 g/mol to about 5,000 g/mol, from about 4,000 g/mol to about 50,000 g/mol, from about 4,000 g/mol to about 40,000 g/mol, from about 4,000 g/mol to about 30,000 g/mol, from about 4,000 g/mol to about 20,000 g/mol, from about 4,000 g/mol to about 10,000 g/mol from about 4,000 g/mol to about 8,000 g/mol, from about 5,000 g/mol to about 50,000 g/mol, from about 5,000 g/mol to about 40,000 g/mol, from about 5,000 g/mol to about 30,000 g/mol, from about 5,000 g/mol to about 20,000 g/mol, from about 5,000 g/mol to about 10,000 g/mol, or from about 5,000 g/mol to about 8,000 g/mol.

The polyvinyl alcohol can be hydrolyzed to any suitable degree as measured by conventional techniques. The degree of hydrolysis indicates the fraction of polyvinyl alcohol backbone repeating units that bear a hydroxyl group. For example, in some embodiments, the polyvinyl alcohol is hydrolyzed from about 20% to about 99%, such as from about 40% to about 95% or from about 50% to about 90%.

The polyvinyl alcohol can be included in any suitable amount. In some embodiments, the polyvinyl alcohol can be present in an amount of from about 0.001 wt. % to about 0.2 wt. %. For example, in some embodiments, the polyvinyl alcohol is present in an amount of from about 0.001 wt. % to about 0.15 wt. %, from about 0.001 wt. % to about 0.1 wt. %, from about 0.001 wt. % to about 0.05 wt. %, from about 0.01 wt. % to about 0.2 wt. %, from about 0.01 wt. % to about 0.15 wt. %, from about 0.01 wt. % to about 0.1 wt. %, from about 0.01 wt. % to about 0.05 wt. %, from about 0.05 wt. % to about 0.2 wt. %, from about 0.05 wt. % to about 0.15 wt. %, from about 0.05 wt. % to about 0.1 wt. %, or from about 0.1 wt. % to about 2 wt. %.

In some embodiments, the polishing composition can optionally include an oxidizing agent for oxidizing the substrate to aid in the desired material removal. In some embodiments, the polishing composition comprises an oxidizing agent consisting of hydrogen peroxide. Hydrogen peroxide is a particularly preferred oxidizing agent in accordance with embodiments of the invention.

If included, the hydrogen peroxide can be present in any suitable amount. In some embodiments, the hydrogen peroxide is present in the polishing composition in an amount of from about 0.01 wt. % to about 4 wt. %. For example, in some embodiments, the hydrogen peroxide is present in an amount of from about 0.01 wt. % to about 3 wt. %, from about 0.01 wt. % to about 2 wt. %, from about 0.01 wt. % to about 1 wt. %, from about 0.01 wt. % to about 0.5 wt. %, from about 0.1 wt. % to about 4 wt. %, from about 0.1 wt. % to about 3 wt. %, from about 0.1 wt. % to about 2 wt. %, from about 0.1 wt. % to about 1 wt. %, from about 0.5 wt. % to about 4 wt. %, from about 0.5 wt. % to about 3 wt. %, from about 0.5 wt. % to about 2 wt. %, or from about 0.5 wt. % to about 1 wt. %.

The polishing composition of the invention can have any suitable pH. In some embodiments, the polishing composition can desirably have a pH of from about 1 to about 5. Such a pH can be desirable because nickel is more soluble at a lower pH, and nickel oxide is more readily hydrolyzed at a low pH. For example, in some embodiments, the polishing composition exhibits a pH of from about 1 to about 4, about 1 to about 3, such as from about 1 to about 2, from about 2 to about 4, from about 2 to about 3, or from about 3 to about 4, or from about 3 to about 5.

If desired, to achieve such a pH level, a pH adjuster can be utilized. Any suitable pH adjuster can be included in the polishing composition. By way of example, the pH adjuster can be in the form of one or more of nitric acid, sulfuric acid, and phosphoric acid. The pH adjuster is included in an amount effective to achieve the desired pH level, such as in an amount of from about 0.0001 wt. % to about 20 wt. %, e.g., from about 0.001 wt. % to about 10 wt. %, from about 0.01 wt. % to about 5 wt. %, or from about 0.02 wt. % to about 3 wt. %.

Biocides as known in the art can be used in some embodiments. The biocide can be any suitable biocide and can be present in the polishing composition in any suitable amount. By way of example, and not limitation, a suitable biocide is an isothuazolinone biocide, isothiazolinone, or the like. The amount of biocide used in the polishing composition typically can be from about 1 to about 60, e.g., about 1 to about 50 ppm, such as about 10 to about 20 ppm.

Water is present in the polishing composition to serve as an aqueous carrier, and desirably in order to allow for dispersion of particles in some embodiments. The water can be present in any suitable amount. For example, the water can be present in an amount of from about 75 wt. % to about 99 wt. %. In some embodiments, the water is present, e.g., from about 75 wt. % to about 99 wt. %, such as from about 80 wt. % to about 99 wt. %, from about 80 wt. % to about 95 wt. %, or from about 85 wt. % to about 95 wt. %.

The polishing composition can be prepared by any suitable technique, many of which are known to those skilled in the art. The polishing composition can be prepared in a batch or continuous process. Generally, the polishing composition can be prepared by combining the components thereof in any order.

It will be understood that, generally, the actual quantity of one or more ingredient in compositions in accordance with embodiments of the invention (e.g., silica; a first alcohol comprising one or more of monohydric alcohol, polyhydric alcohol, and diglycol; nickel complexing agent; polyvinyl alcohol; pH adjuster; hydrogen peroxide; biocide; and water) may vary depending on the desired degree of dilution or concentration. In this respect, some embodiments can be packaged in the form of a concentrate (e.g., a 50 times concentrate, a 100 times concentrate, a 200 times concentrate, etc.) where water can be later added to dilute the solution, such as at a point of use (e.g., by an end user), or the solution can be packaged in a diluted form with water already included. For example, in some embodiments, the concentrated forms of each ingredient and/or the solution as a whole can facilitate ease of shipping, distribution, and sale. However in other embodiments, each ingredient and/or the solution as a whole can be in a diluted form, e.g., to simplify end use. Thus, the weight ranges for ingredients as set forth herein can refer to either the diluted or concentrated ranges.

Accordingly, each ingredient can be present in a diluted form that is suitable for end use or in a form that is concentrated and then diluted (e.g., 2 times, 5 times, 10 times, 25 times, 40 times, 50 times, 60 times, 70 times, 100 times, 125 times, 150 times, 175 times, 200 times, etc. to the diluted form). When the concentrate is diluted with an equal volume of water (e.g., 1 equal volumes water, 4 equal volumes of water, 9 equal volumes of water, 24 equal volumes of water, 39 equal volumes of water, 49 equal volumes of water, 59 equal volumes water, 69 equal volumes of water, 99 equal volumes of water, 124 equal volumes of water, 149 equal volumes of water, 174 equal volumes of water, or 199 equal volumes of water, respectively), each ingredient will be present in embodiments of the invention in an amount within the diluted ranges set forth below for each component. Furthermore, as will be understood by those of ordinary skill in the art, the concentrate can contain an appropriate fraction of the water present in the final solution. For example, in some applications, e.g., polishing compositions, the concentrate can contain an appropriate fraction of the water present in the final polishing composition in order to ensure that the polishing composition components are at least partially or fully dissolved in the concentrate.

"Pot life" is understood in the art to indicate the polishing composition's useable lifetime and can relate to the stability of the composition. In some embodiments, the polishing composition is sufficiently stable such that the composition has a preferred pot life of at least about two days at the point of use. For example, in some embodiments, the polishing composition has a pot life of at least about three days at the point of use, e.g., at least about four days, at least about five days, etc. The desired pot life exhibited by preferred embodiments of the invention are advantageous in reducing costs as the polishing composition does not need to be replenished as frequently.

As another illustrative embodiment, the polishing composition comprises, consists of, or consists essentially of silica; water; a first alcohol; a nickel complexing agent and a polyvinyl alcohol. The first alcohol can be in the form of one or more of isopropanol (IPA), butyl alcohol, ethylene glycol, propylene glycol, diethylene glycol, pentaerythritol, dipentaerytritol, trimethyolpropane, and dipropylene glycol, in some embodiments. A pH adjuster and biocide also can optionally be included.

In another illustrative embodiment, the composition comprises, consists of, or consists essentially of water; silica; a first alcohol comprising one or more of isopropanol (IPA), butyl alcohol, ethylene glycol, propylene glycol, diethylene glycol, pentaerythritol, dipentaerytritol, trimethyolpropane, and dipropylene glycol; nickel complexing agent comprising one or more of an organic monocarboxylic acid, an organic bicarboxylic acid, an amino carboxylic acid, and any salt thereof; a second alcohol in the form of polyvinyl alcohol; and hydrogen peroxide. A pH adjuster and biocide can optionally be included. In some embodiments, the nickel complexing agent comprises HEDTA and/or glycine, and the polyvinyl alcohol has a molecular weight of from about 2,000 g/mol to about 50,000 g/mol.

In another illustrative embodiment, the composition comprises, consists of, or consists essentially of water; silica; a first alcohol exhibiting a flash point of at least about 10° C. (50° F.); nickel complexing agent comprising one or more of an organic monocarboxylic acid, an organic bicarboxylic acid, an amino carboxylic acid, and any salt thereof; a second alcohol in the form of polyvinyl alcohol; and hydrogen peroxide. A pH adjuster and biocide can optionally be included. In some embodiments, the nickel complexing agent comprises HEDTA and/or glycine, and the polyvinyl alcohol has a molecular weight of from about 2,000 g/mol to about 50,000 g/mol.

It shall be noted that the embodiments described above are merely examples of combinations of the ingredients in accordance with the invention. Other exemplary combinations are apparent from the entirety of the description herein. It will also be understood by one of ordinary skill in the art that each of these embodiments may be used in various combinations with the other embodiments provided herein.

It will be further understood that embodiments "consisting essentially of" the recited ingredients or method steps means that the composition precludes the inclusion of any additional ingredient or method step that materially affects the inventive polishing composition or method (e.g., ingredients or method steps that alter the desired effects of the invention, particularly with regard to removal rate as discussed herein or increasing negative effects on polishing performance (e.g., particularly with respect to surface roughness or defectivity)). Compounds or method steps that do not affect the removal rate or polishing performance with respect to surface roughness or defectivity can be included in such embodiments "consisting essentially of" the recited ingredients or method steps.

The invention also provides a method of polishing a substrate. The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof. Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, 5,433,651, 5,609,511, 5,643,046, 5,658,183, 5,730,642, 5,838,447, 5,872,633, 5,893,796, 5,949,927, and 5,964,643. Desirably, the inspection or monitoring of the progress of the polishing process with respect to a workpiece being polished enables the determination of the polishing end-point, i.e., the determination of when to terminate the polishing process with respect to a particular workpiece.

The method of polishing a substrate comprises, consists of, or consists essentially of (i) providing a substrate, (ii) providing a polishing pad, and (iii) providing a polishing composition as described herein in various embodiments. For example, the polishing composition can comprise (a) silica; (b) a first alcohol; (c) a second alcohol consisting of polyvinyl alcohol (d) a nickel complexing agent; (e) water. The first alcohol can have a flash point of at least about 10° C. (50° F.) and/or comprise one or more of monohydric alcohol, polyhydric alcohol, or diglycol. Various exemplary ingredients can be included in the composition as described herein. In some embodiments, the polishing composition can optionally comprise hydrogen peroxide, pH adjustor, and/or biocide. In the method, (iv) the polishing composition is dispensed to the surface of the substrate and the polishing pad contacts the surface of the substrate. The method also includes (v) abrading at least a portion of the surface of the substrate to remove at least some portion of the substrate and to polish the surface of the substrate.

Advantageously, in accordance with some embodiments of the invention, polishing of a substrate can be performed in one-step instead of two-steps as in conventional systems. For example, while conventional systems may require a step of bulk polishing (for high material removal rates) and a second step of fine polishing (to obtain a low roughness or waviness, and a scratch-free surface finish), embodiments of polishing composition and method of the invention can be used to polish the substrate in a single step.

The composition and method of the invention can be used to produce any suitable removal rate of desired material (e.g., at least some nickel-phosphorous) from the substrate. The removal rate of a substrate can be determined using any suitable technique. Examples of suitable techniques for determining the removal rate of a substrate include weighing the substrate before and after use of the inventive polishing method to determine the amount of substrate removed per unit of polishing time, which can be correlated with the removal rate in terms of thickness of substrate removed per unit of polishing time, and determining the thickness of the substrate before and after use of the inventive polishing method to directly measure the removal rate of the substrate per unit of polishing time.

For example, in some embodiments, the polishing composition and method of the invention can be used to produce a removal rate of at least about 10 mg/min, such as at least about 12 mg/min, at least about 14 mg/min, at least about 16 mg/min, at least about 18 mg/min, at least about 20 mg/min, etc. (e.g., from about 10 mg/min to about 22 mg/min, from about 12 mg/min to about 22 mg/min, from about 14 mg/min to about 22 mg/min, from about 16 mg/min to about 22 mg/min, from about 18 mg/min to about 22 mg/min, or from about 20 mg/min to about 22 mg/min).

Desirably, the inventive polishing composition and method disclosed herein result in reduction in the total scratch count and/or in the long scratch count when used to polish substrates comprising a nickel-phosphorous coated memory disk as compared with compositions absent combinations of components of embodiments discussed herein. One measure of defectivity is the total scratch count as defined as the sum of shallow, micro, and deep scratches on the surface of a substrate after polishing. Another measure of defectivity is the long scratch count on the surface of the substrate after polishing. Another measure of defectivity is the count of micro particles that either adhere to the surface or are embedded in the surface of a substrate that has been polished. The substrate, such as a nickel-phosphorous coated memory disk, can be inspected using optical defect scanning equipment such as the Candela 6100 and 6300 series and similar instruments available from KLA Tencor (Milpitas, Calif.). Long scratch count can be defined as the number of scratches that are long than about 2 pixels in the image obtained by use of the Candela equipment. In some embodiments, the polishing composition produces low particle defects when polishing a substrate, such as a total scratch count of less than about 2000, e.g., less than about 1000, less than 500 or less than 200.

The method can be used with any suitable substrate. For example, the substrate can include at least one layer of nickel-phosphorous, such that at least some nickel-phosphorous is removed from the surface of the substrate to polish the surface of the substrate. In some embodiments, the substrate is a nickel-phosphorous coated aluminum memory disk. However, the method of the invention can be used to polish a variety of other types of substrates, e.g., substrates that include metals used in semiconductor wafers. Thus, in some embodiments, the substrate is a semiconducting wafer comprising metal conductors. The metal conductors can be formed from any suitable metal. For example, in some embodiments, the metal conductors are formed from at least copper, tungsten, tantalum, cobalt, ruthenium, or any combination thereof. The semiconductor wafer can also comprise a low-k dielectric material.

The following Examples further illustrate the invention but, of course, should not be construed as in any way limiting its scope.

Example 1

This Example demonstrates the effect of isopropyl alcohol ("IPA") on the removal rate ("RR") achievable by some embodiments of the inventive polishing composition in the polishing of separate substrates comprising nickel-phosphorous-coated hard disks.

Four compositions, designated compositions 1A-1D, were prepared. Composition 1A (control) consisted of (a) 3 wt. % of colloidal silica commercially available as Bindzil DP-5110 ("DP-5110") from Akzo Nobel N.V. (Bohus, Sweden), (b) 300 ppm of polyvinyl alcohol ("PVA") (molecular weight of 6000 g/mol; 78% hydrolyzed), (c) 0.5 wt. % of Ni complexer in the form of hydroxyethylenediaminetriacetic acid ("HEDTA"), (d) nitric acid was added as a pH adjuster to bring the final pH to 1.9, (e) hydrogen peroxide in an amount of 0.6 wt. %, and (f) water in the remaining amount. Furthermore, IPA was added in various amounts as described below to the formulation of control composition 1A to produce compositions 1B-1D.

Six disks per treatment were polished using a polisher, commercially available as Hamai 9B from Hamai Co., Ltd. (Tokyo, Japan), and a polishing pad commercially identified as FK1N available from Fujibo Group (Tokyo, Japan) with a polishing composition flow rate of 450 ml/min. The post-polished disks were cleaned with a cleaner commercially available as Invenpro ISW001 from Invenpro (Selangor Darul Ehsan, Malaysia) and then dried. Weight measurements were carried out on three of the six disks to understand the removal rate (mg/min) achieved by polishing compositions 1A-1D. The remaining three disks per treatment were kept for measurement of scratch, µWa-s and AFM Ra to eliminate contamination. The results are summarized in Table 1 below.

"Percent RR enhancement" was calculated by subtracting the removal rate of composition 1A (control) from the removal rates of compositions 1B-1D and then dividing the result by the removal rate of composition 1A (control). Surface roughness was measured in Angstroms using an atomic force microscope commercially available as AFM NanoScope D3100 from Bruker Corporation (Billerica, Mass.) and an interference microscope commercially available as NewView™ 100 from Zygo Corporation (Middlefield, Conn.) at a wavelength of about 80 to 500 µm. In Atomic Force Microscopy ("AFM"), the topography is mapped out by measuring the mechanical force exerted on the tip due to tip-surface interaction. "AFM Ra" indicates the surface roughness expressed by mean value of the surface relative to the center plane.

TABLE 1

| Composition | IPA (wt. %) | RR (mg/min) | Percent RR enhancement | AFM Ra (Å) |
|---|---|---|---|---|
| 1A (control) | — | 14.5 | — | 1.25 |
| 1B | 0.5 wt. % | 17.6 | 21% | 1.26 |
| 1C | 5 wt. % | 19.0 | 31% | 1.23 |
| 1D | 10 wt. % | 18.9 | 30% | 1.24 |

Adding IPA to composition 1A (control) for compositions 1B-1D was found to significantly improve the material removal rate by as much as about 20% to 30%, as illustrated by the data presented in Table 1. Furthermore, the increased removal rates from the addition of IPA did not compromise surface topography. As seen in Table 1, the values for "AFM Ra" indicate that even with high removal rates, low surface roughness was still maintained.

Example 2

This Example was conducted to further understand the effect of various ingredients on the removal rate achievable by some embodiments of the inventive polishing composition in the polishing of separate substrates comprising nickel-phosphorous-coated hard disks.

Four systems were studied—(A) colloidal silica (DP-5110) only, (B) colloidal silica (DP-5110) with HEDTA, (C) colloidal silica (DP-5110) with PVA, and (D) colloidal silica (DP-5110), with HEDTA and PVA (comparable to composition 1A (control) in Example 1). Each system also included nitric acid as a pH adjuster and hydrogen peroxide in the amounts described in Example 1. For each system, two compositions were prepared, one with IPA and one without. Each composition contained nitric acid as a pH adjuster and hydrogen peroxide in an amount of 0.6 wt. % in the same manner as described in Example 1. Table 2 shows the various other ingredients and amounts in each of compositions 2A-1-2D-2, where compositions 2A-1, 2B-1, 2C-1, and 2D-1 did not include IPA and compositions 2A-2, 2B-2, 2C-2, and 2D-2 included IPA.

TABLE 2

| Composition | Colloidal silica (wt. %) | HEDTA (wt. %) | PVA (ppm) | IPA (wt. %) |
|---|---|---|---|---|
| 2A-1 (control) | 3 wt. % | — | — | — |
| 2A-2 (control) | 3 wt. % | — | — | 5 wt. % |
| 2B-1 (control) | 3 wt. % | 0.5 wt. % | — | — |
| 2B-2 (control) | 3 wt. % | 0.5 wt. % | — | 5 wt. % |
| 2C-1 (control) | 3 wt. % | — | 300 ppm | — |
| 2C-2 (control) | 3 wt. % | — | 300 ppm | 5 wt. % |
| 2D-1 (control) | 3 wt. % | 0.5 wt. % | 300 ppm | — |
| 2D-2 (inventive) | 3 wt. % | 0.5 wt. % | 300 ppm | 5 wt. % |

The polishing parameters were comparable to those in Example 1. The data depicted in FIG. 1 and presented in Table 3 illustrate the performance of each composition with regards to removal rate. The "Percent RR Change" column shows the percent change in removal rate between a particular composition without and with the addition of IPA.

TABLE 3

| Composition | RR (mg/min) | Percent RR Change |
|---|---|---|
| 2A-1 | 12.32 | — |
| 2A-2 | 9.83 | −20% |
| 2B-1 | 14.89 | — |
| 2B-2 | 11.26 | −24% |
| 2C-1 | 12.7 | — |
| 2C-2 | 12 | −5% |
| 2D-1 | 15.58 | — |
| 2D-2 | 20.28 | 30% |

First, by comparing the four systems without IPA, it can be observed that HEDTA acts as an effective accelerator for NiP removal as demonstrated by compositions 2B-1 and 2D-1. Compositions 2A-1 and 2C-1, which did not include HEDTA, had lower removal rates. While not wishing to be bound by any particular theory, it is believed that this effect is due to the efficient chelation of HEDTA with nickel (Ni) ions, such that HEDTA forms complexes with Ni ions, thereby preventing the re-deposition of Ni oxide and removing Ni oxide from the substrate surface.

Second, for the control systems (i.e., compositions 2A to 2C), the addition of IPA resulted in a slower removal rate. Only when IPA in an amount of 5 wt. % was introduced into the inventive system was the removal rate significantly enhanced (by 30%) as seen with composition 2D-2. Therefore, these results suggest that, in accordance with some embodiments, there is a requirement for the combination of a first alcohol, a second alcohol in the form of polyvinyl alcohol, a nickel complexing agent to get a rate boost.

Example 3

This Example shows the effect of the inventive composition on removal rate in polishing compositions with smaller size abrasive particles. Two compositions, designated 3A (control) and 3B (inventive), were prepared as described in Example 1, the exception being that 3 wt. % of a smaller sized colloidal silica, commercially available as Bindzil 257/360, was used as opposed to 3 wt. % of colloidal silica (DP-5110). The Binzil 257/360 had an average particle size of 13 nm, as measured by dynamic light scattering. The DP5110 colloidal silica had an average particle size of 25 nm measure by the same method.

The polishing parameters were comparable to those in Example 1.

Table 4 below illustrates the removal rate improvement achieved when IPA is added to a polishing composition containing smaller sized silica.

TABLE 5

| Composition | IPA (wt. %) | RR (mg/min) | Percent RR enhancement |
|---|---|---|---|
| 3A (control) | — | 9.8 | — |
| 3B (inventive) | 10 wt. % | 11.3 | 15% |

As compared with composition 3A (control), composition 3B, including IPA in an amount of 10 wt. %, shows a 15% higher removal rate, indicating that the synergistic effect that occurs in the presence of alcohol effect is capable of helping overcome the limitation of lower removal rate in polishing compositions containing relatively small size particles.

These results suggest that particle size of colloidal silica in polishing compositions including IPA in accordance with embodiments of the invention does not affect removal rate enhancement. Moreover, these results in conjunction with the results of Example 2 (which tested polishing compositions in accordance with embodiments of the invention including larger sized silica (DP-5110)), suggest that a lower amount of IPA will still enhance removal rate when included with various other ingredients, regardless of particle size.

Example 4

This Example tested the polishing performance of polishing compositions in accordance with embodiments of the invention including alcohols other than IPA. Specifically, five polishing compositions, designated compositions 4A (control)-4E, were prepared according to the procedure described in Example 1. Composition 4A (control) did not include any alcohol. Compositions 4B-4E were prepared with IPA, ethylene glycol ("EG"), dipropylene glycol ("DPG"), and n-butyl alcohol ("BA"), respectively. Each alcohol component was included in an amount of 0.5 wt. %.

The polishing parameters were the same as those described in Example 1.

Table 6 sets forth the results of the polishing test, including removal rate, "percent RR enhancement," μWa-s (Å), and AFM Ra (Å). "μWa-s" refers to short-wavelength micro waviness. "Waviness" of the surface of a substrate refers to irregularities having a larger wavelength than roughness on the surface of the substrate. "μWa-s" is measured by a white light interferometry microscope commercially available as NewView™ 100 from Zygo Corporation to describe surface roughness performance. The measurement wavelength for μWa-s is 80-500 um.

TABLE 6

| Composition | Alcohol | RR (mg/min) | Percent RR enhancement | μWa-s (Å) | AFM Ra (Å) |
|---|---|---|---|---|---|
| 4A (control) | — | 13 | — | 1.03 | 1.25 |
| 4B | IPA | 17.6 | 35% | 1.01 | 1.26 |

TABLE 6-continued

| Composition | Alcohol | RR (mg/min) | Percent RR enhancement | μWa-s (Å) | AFM Ra (Å) |
|---|---|---|---|---|---|
| 4C | EG | 17.2 | 32% | 1.03 | 1.11 |
| 4D | DPG | 19.0 | 46% | 1.02 | 1.26 |
| 4E | BA | 20.0 | 54% | 1.03 | 1.28 |

As is apparent from the results in Table 6, all of the three alternatives to IPA resulted in high removal rate (from about 30% to about 50% higher than composition 4A (control)) and generated comparable surface roughness. Composition 4C offered similar percent removal rate enhancement to composition 4B, prepared with EG and IPA, respectively. Compositions 4D and 4E, prepared with DPG and BA, respectively, provided significantly higher percent removal rate enhancements. Furthermore, EG and DPG are preferable alcohol components in some embodiments of the invention because they are odorless and have much higher flash point than IPA, such that they are favorable for production use.

Example 5

This Example demonstrates a single-step polish of NiP CMP process. Three polishing compositions were prepared, designated compositions 5A-5C.

Composition 5A was prepared with fumed alumina in an amount of 0.25 wt %, α-alumina in an amount of 1 wt %, wet-process silica in an amount of 1.5 wt %, malonic acid, hydrogen peroxide and nitric acid (as pH adjustor) in water at a pH of 2.2. Compositions 5B (control) and 5C were prepared as described in Example 1, with composition 5B (control) being prepared without an alcohol component and composition 5C being prepared with IPA as an alcohol component in an amount of 5 wt %.

The normal two-step polish (Step I aggressive polish on a polisher commercially available as SpeedFam 16B from SpeedFam (Ayase-shi, Kanagawa 252-1123 Japan), and Step II fine polish on a polisher commercially available as Hamai 9B) with two slurries (composition 5A slurry for Step I and composition 5B (control) for Step II) used as baseline for performance comparison, while the single-step test was carried out on the Hamai 9B polisher using composition 5C. In this example, 6 disks were polished per treatment.

The results are set forth in Table 5. Total polishing time, measured in minutes, is defined as the sum of ramp-up time, main polish time, and ramp-down time. "Ramp-up time" means the time needed for the polisher to pre-flow the composition and gradually increase down force and platen speed to the required values of main polish. "Ramp-down time" means the time needed for the polisher to gradually decrease down force and platen speed after main polishing process until the polishing eventually stops.

TABLE 7

| Test | Polishing Slurry | Target Removal (mg) | Total polishing* time (min) | RR (mg/min) | μWa-s (Å) | AFM Ra (Å) |
|---|---|---|---|---|---|---|
| Two-step (Two platens with baseline compositions) | Step I: 5A Step II: 5B (control) | Step I: 120 Step II: 32 | 10.2 | Step I: 26.4 Step II: 10 | 0.85 | 1.22 |

TABLE 7-continued

| Test | Polishing Slurry | Target Removal (mg) | Total polishing* time (min) | RR (mg/min) | µWas (Å) | AFM Ra (Å) |
|---|---|---|---|---|---|---|
| Single-step (Single platen with high rate composition) | 5C | 152 | 9.5 | 18.4 | 0.88 | 1.24 |

*All ramp-up and ramp-down time is included in the total polishing time.

It was found that composition 5C for single-step polishing required even shorter polishing time to achieve the same target removal amount as compared with normal two-step polishing. Furthermore, this single-step polishing process generated comparable surface finish to the two-step polishing process.

It will be understood that other ingredients could be added to polishing compositions in accordance with embodiments of the invention that do not affect the desirably high removal rate that is achieved without comprising other aspects of polishing performance.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A polishing composition comprising:
   (a) silica present in an amount of from about 0.01 wt. % to about 10 wt. %;
   (b) first alcohol comprising one or more of monohydric alcohol, polyhydric alcohol, and diglycol;
   (c) nickel complexing agent, wherein the nickel complexing agent is one or more of hydroxyethylenediaminetriacetic acid (HEDTA), glycine, oxime and/or dioxime Ni complexer, and any salt thereof;
   (d) second alcohol consisting of polyvinyl alcohol; and
   (e) water,
   wherein the polishing composition has a pH of from about 1 to about 5 and the polyvinyl alcohol has a molecular weight of from about 2,000 g/mol to about 50,000 g/mol.

2. The composition of claim 1, wherein the polyvinyl alcohol is present in an amount of from about 0.001 wt. % to about 0.2 wt. %.

3. The composition of claim 1, wherein the first alcohol is one or more of isopropanol (IPA), butyl alcohol, ethylene glycol, propylene glycol, diethylene glycol, pentaerythritol, dipentaerytritol, trimethyolpropane, and dipropylene glycol.

4. The composition of claim 3, wherein the first alcohol is present in an amount of from about 0.05 wt. % to about 20 wt. %.

5. The composition of claim 1, wherein the nickel complexing agent comprises HEDTA and glycine.

6. The composition of claim 1, wherein the nickel complexing agent is present in an amount of from about 0.01 wt. % to about 10 wt. %.

7. The composition of claim 1, wherein the composition further comprises hydrogen peroxide.

8. The composition of claim 7, wherein the hydrogen peroxide is present in an amount of from about 0.01 wt. % to about 4 wt. %.

9. The composition of claim 1, wherein the silica has an average particle size of from about 5 nm to about 80 nm.

10. The composition of claim 1, wherein the silica has an average primary particle size of about 40 nm or less.

11. A polishing composition comprising:
   (a) silica present in an amount of from about 0.01 wt. % to about 10 wt. %;
   (b) first alcohol having a flash point of at least about 10° C.;
   (c) nickel complexing agent;
   (d) second alcohol consisting of polyvinyl alcohol;
   (e) water, and
   wherein the polishing composition has a pH of from about 1 to about 4 and the polyvinyl alcohol is present and has a molecular weight of from about 2,000 g/mol to about 50,000 g/mol.

12. The composition of claim 11, wherein the first alcohol is present in an amount from about 0.05 wt. % to about 20 wt. %.

13. The composition of claim 11, wherein the nickel complexing agent comprises one or more of an organic monocarboxylic acid, an organic bicarboxylic acid, an amino carboxylic acid, and any salt thereof.

14. The composition of claim 11, wherein the composition further comprises hydrogen peroxide.

15. A method of polishing a substrate, which method comprises:
- providing a substrate,
- (ii) providing a polishing pad,
- (iii) providing the polishing composition of claim 1:
- (iv) dispensing the polishing composition and contacting the polishing pad, to a surface of the substrate, and
- (v) abrading at least a portion of the surface of the substrate to polish the surface of the substrate.

16. A method of polishing a substrate, which method comprises:
- providing a substrate,
- (ii) providing a polishing pad,
- (iii) providing the polishing composition of claim 11:
- (iv) dispensing the polishing composition and contacting the polishing pad, to a surface of the substrate, and
- (v) abrading at least a portion of the surface of the substrate to remove at least some portion of the substrate and to polish the surface of the substrate.

17. The method of claim 16, wherein the substrate comprises at least one layer of nickel-phosphorous, and at least some nickel-phosphorous is removed from the surface of the substrate to polish the surface of the substrate.

18. The method of claim 16, wherein the substrate is a nickel-phosphorous coated aluminum memory disk.

* * * * *

UNITED STATES PATENT AND TRADEMARK OFFICE
CERTIFICATE OF CORRECTION

PATENT NO. : 10,315,285 B2
APPLICATION NO. : 15/091275
DATED : June 11, 2019
INVENTOR(S) : Li et al.

Page 1 of 1

It is certified that error appears in the above-identified patent and that said Letters Patent is hereby corrected as shown below:

In the Claims

In Column 16, Claim 3, Line 26, delete "(WA)" and insert --(IPA)--.

In Column 17, Claim 15, Line 3, add --(i)-- at the beginning of the line.

In Column 17, Claim 16, Line 12, add --(i)-- at the beginning of the line.

Signed and Sealed this
Thirtieth Day of July, 2019

Andrei Iancu
*Director of the United States Patent and Trademark Office*